United States Patent
Okuhara et al.

(10) Patent No.: US 9,981,581 B2
(45) Date of Patent: May 29, 2018

(54) VEHICLE SEAT

(71) Applicant: TOYOTA BOSHOKU KABUSHIKI KAISHA, Aichi-ken (JP)

(72) Inventors: Yoshikatsu Okuhara, Aichi-ken (JP); Shinya Ito, Aichi-ken (JP); Hirotaka Kato, Aichi-ken (JP); Taku Imajo, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 15/796,068

(22) Filed: Oct. 27, 2017

(65) Prior Publication Data

US 2018/0118065 A1    May 3, 2018

(30) Foreign Application Priority Data

Oct. 31, 2016    (JP) .................. 2016-212917

(51) Int. Cl.
*B60N 2/58* (2006.01)
*B60N 2/28* (2006.01)

(52) U.S. Cl.
CPC ............. *B60N 2/5833* (2013.01); *B60N 2/58* (2013.01); *B60N 2/2887* (2013.01)

(58) Field of Classification Search
CPC .. B60N 2/2887; B60N 2/2893; B60N 2/6036; B60N 2/5833
See application file for complete search history.

(56) References Cited

U.S. PATENT DOCUMENTS

| | | | | |
|---|---|---|---|---|
| 6,478,376 B2 * | 11/2002 | Hayashi | ............... | B60N 2/2821 297/250.1 |
| 7,093,896 B2 * | 8/2006 | Morita | ................. | B60N 2/2821 297/253 |
| 7,281,763 B1 * | 10/2007 | Hayashi | ............... | B60N 2/2893 297/253 |
| 7,699,396 B2 * | 4/2010 | Ghisoni | ................... | B60N 2/58 297/188.2 |
| 9,352,676 B1 * | 5/2016 | Wright | ..................... | B60N 2/58 |
| 9,493,099 B2 * | 11/2016 | Ruthinowski | ............ | B60N 2/70 |
| 9,592,750 B2 * | 3/2017 | Asaeda | ..................... | B60N 2/58 |

(Continued)

FOREIGN PATENT DOCUMENTS

| | | | | | |
|---|---|---|---|---|---|
| JP | 2001246973 | A | * | 9/2001 | ............... B60N 2/58 |
| JP | 2015036282 | A | * | 2/2015 | ............. B60N 2/289 |
| JP | 2015-85730 | | | 5/2015 | |

*Primary Examiner* — Timothy J Brindley
(74) *Attorney, Agent, or Firm* — Greenblum & Bernstein, P.L.C.

(57) ABSTRACT

A vehicle seat includes: a cover member that covers an ISOFIX anchor for fixing a child seat; an intermediate portion that is exposed at a position between the cover member and the ISOFIX anchor in a state where the cover member is opened; and a stopper that retains the cover member in a state where the cover member is opened, wherein the stopper has an engagement part and an abutting part, wherein the engagement part of the stopper is detachably engaged with at least one of the rear surface and the intermediate portion in a state where the cover member is opened, and wherein the abutting part of the stopper abuts on the other of the rear surface and the intermediate portion so as to prevent the cover member from being moved in a closing direction.

10 Claims, 12 Drawing Sheets

(56) References Cited

U.S. PATENT DOCUMENTS

| | | | |
|---|---|---|---|
| 9,688,166 B2 * | 6/2017 | Ruthinowski | B60N 2/2887 |
| 9,783,085 B2 * | 10/2017 | Nilius | B60N 2/28 |
| 2007/0176476 A1 * | 8/2007 | Weber | B60N 2/2893 |
| | | | 297/253 |
| 2015/0084388 A1 | 3/2015 | Arai et al. | |
| 2016/0200224 A1 * | 7/2016 | Fujikake | B60N 2/289 |
| | | | 297/452.38 |
| 2017/0349074 A1 * | 12/2017 | Fujiwara | B60N 2/64 |

* cited by examiner

VEHICLE SEAT

CROSS-REFERENCE TO RELATED APPLICATION

This application claims priorities from Japanese Patent Application No. 2016-212917 filed on Oct. 31, 2016, the entire subject matters of which is incorporated herein by reference.

TECHNICAL FIELD

The present disclosure to a vehicle seat, and particularly to a vehicle seat having an openable and closable cover member which covers and hides at least a portion of an ISOFIX anchor for fixing a child seat.

BACKGROUND

In the related art, a configuration is known in which an ISOFIX anchor as an attachment tool for fixing a child seat is provided in a rear seat surface of a vehicle seat (JP-A-2015-085730). The ISOFIX anchor is provided in the state of being embedded in a hole which is formed though a portion formed in a rear end portion of a seat cushion and bulging in a bank shape. The embedded hole of the ISOFIX anchor is normally configured such that a front-side opening is covered with a cover member which is openable and closable. When the child seat is mounted, the cover member is opened so that the ISOFIX anchor therein is exposed to a front side.

In the above-described related art, the child seat is slid to be pushed in the hole in a state where the cover member is opened, thereby maintaining a position of the cover member in a state where the hole is opened. However, with such a configuration, a space for accepting the cover member in the hole, and a mechanism which maintains the cover member in the hole in an opened posture are provided necessarily, and the hole is increased in size and is complicated.

SUMMARY

The present disclosure is made in consideration of the above-mentioned circumstances, and one of objects of the present disclosure is to provide a vehicle seat that is capable of maintaining a position of a cover member, which covers an embedded hole of an ISOFIX anchor, in an opened state with a more proper configuration.

According to an illustrative embodiment of the present disclosure, there is provided a vehicle seat including: a cover member that covers and hides at least a portion of an ISOFIX anchor for fixing a child seat and is openable and closable, the cover member having a rear surface that is directed to a seat back side in a state where the cover member is closed to cover and hide the ISOFIX anchor and is reversely directed to a seat front side when the cover member is opened; an intermediate portion that is exposed at a position between the cover member and the ISOFIX anchor in a state where the cover member is opened; and a stopper that retains the cover member in a state where the cover member is opened, wherein the stopper has an engagement part and an abutting part, wherein the engagement part of the stopper is detachably engaged with at least one of the rear surface and the intermediate portion in a state where the cover member is opened, and wherein the abutting part of the stopper abuts on the other of the rear surface and the intermediate portion so as to prevent the cover member from being moved in a closing direction.

According to another illustrative embodiment of the present disclosure, there is provided a vehicle seat including: a child seat attachment portion provided with an ISOFIX anchor to which a child seat is detachably attached; a cover member having a rear surface and configured to be movable between a closed position at which the cover member covers the child seat attachment portion in a state where the rear surface is faced toward a rear side of the vehicle seat and an opened position at which the cover member is flipped to face the rear surface toward a front side of the vehicle seat and exposing the child seat attachment portion; an intermediate wall that is located at a position between the ISOFIX anchor and the cover member, the intermediate wall being exposed in a state where the cover member is at the opened position; and a stopper member having an engagement part and an abutting part, the stopper member being configured to retain the cover at the opened position in a state where the engagement part is detachably engaged with at least one of the rear surface and the intermediate wall while the abutting part abuts on the other of the rear surface and the intermediate wall.

DETAILED DESCRIPTION

Hereinafter, embodiments of the present disclosure will be described with reference to the drawings.

Figure 1:
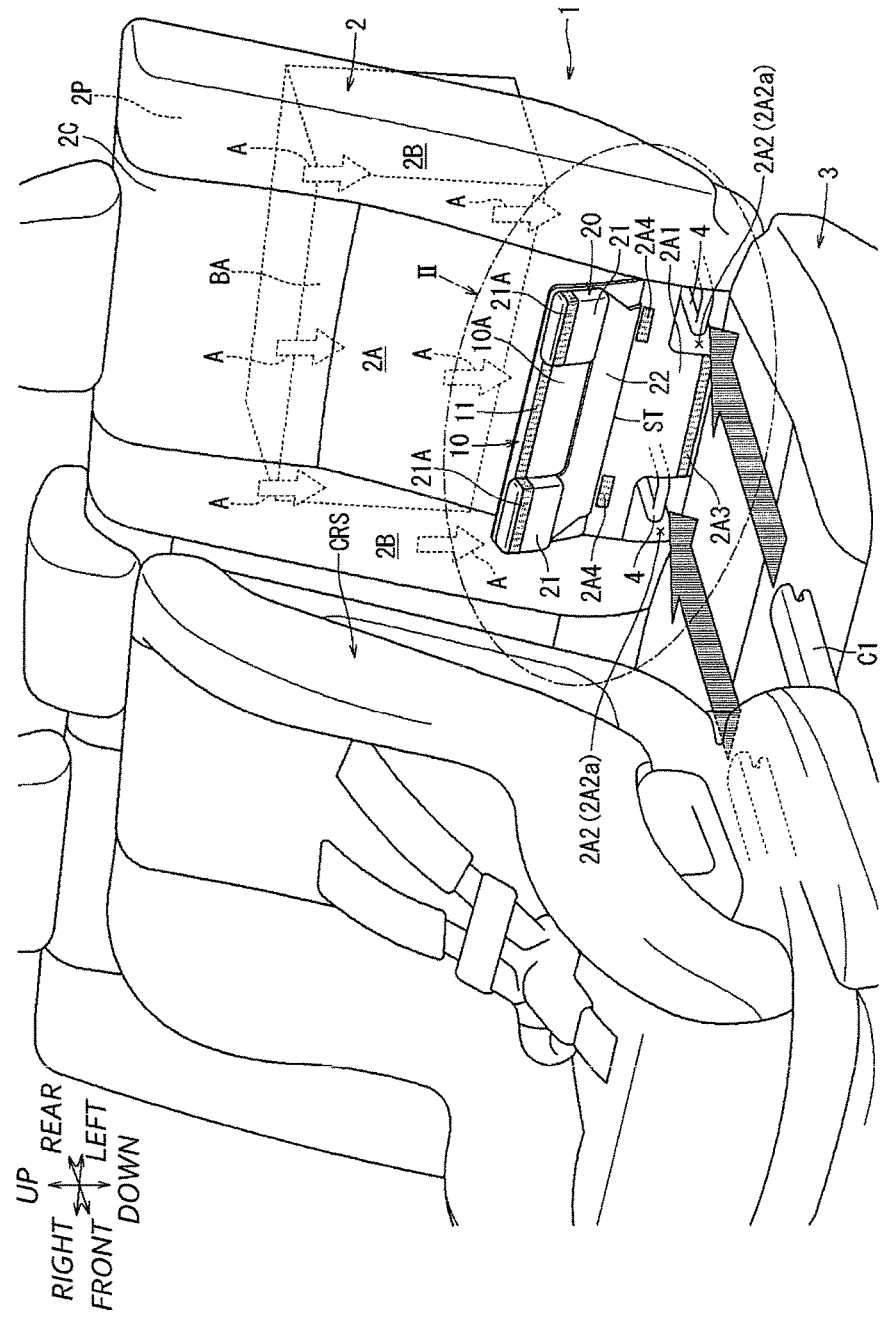
FIG. 1 is a perspective view illustrating a schematic configuration of a vehicle seat of a first embodiment.

First, a configuration of a seat 1 (vehicle seat) according to a first embodiment will be described with reference to FIGS. 1 to 12. In the following description, directions such as front, rear, upper, and lower directions mean respective directions illustrated in the drawings. As illustrated in FIG. 1, the seat 1 of this embodiment is configured as a rear-side seat of a hybrid vehicle, and includes a seat back 2 as a back rest part of a sitting occupant and a seat cushion 3 as a seating part. The seat 1 is configured as a divided seat on a narrow side in a bench seat on which three people can sit and which is divided at a ratio of 6:4 in a width direction. A battery BA is mounted in a back lining of the seat back 2, and cooling air A for cooling the battery BA flows in a gap between the same battery BA and the back lining.

The seat back 2 includes a top plate body 2A which forms the central portion of the front surface thereof in the width direction, and top plate sides 2B which form both side portions in the width direction. The former top plate body 2A is configured to have a relatively flat surface shape and to support the back of the sitting occupant from the rear side. The latter top plate sides 2B are configured to have such a surface shape that each of the top plate sides 2B is obliquely bulging to frontal outside in a mountain shape and to obliquely support the back of the sitting occupant from both sides.

The seat back 2 is configured to be covered entirely with a urethane-foam back pad 2P which functions such that the backrest load of the sitting occupant is elastically received with respect to a metal back frame (not illustrated) forming the inner frame thereof Further, in the seat back 2, the appearance design surface thereof is shaped such that the entire external surface of the back pad 2P is covered with a synthetic-leather back cover 2C. The basic shape of the seat back 2 is formed by the back pad 2P provided in the back cover 2C.

A lower region of the top plate body 2A of the seat back 2 is attached with a horizontally long cover member 10 which is made of synthetic leather and covers the same region in an openable manner from a front side. In the cover member 10, the upper edge is integrally sewn with the back cover 2C (sewn part ST), the lower region of the top plate body 2A is covered or opened to be exposed with respect to the outside by the rotation movement of the upper hinge centered on the sewn part ST (see FIGS. 2 and 6).

Figure 2:
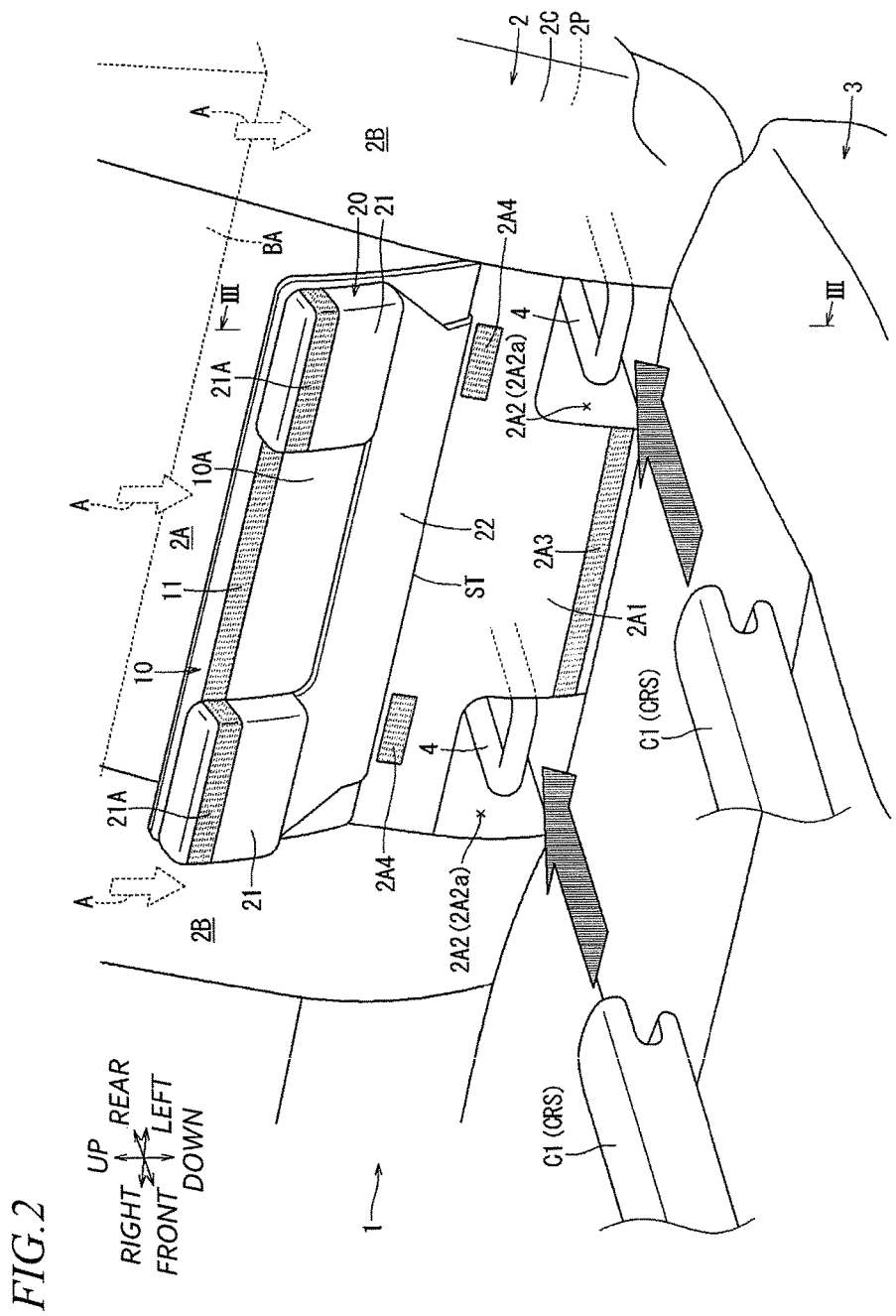
FIG. 2 is an enlarged view of a portion shown by arrow II in FIG. 1.
Figure 3:
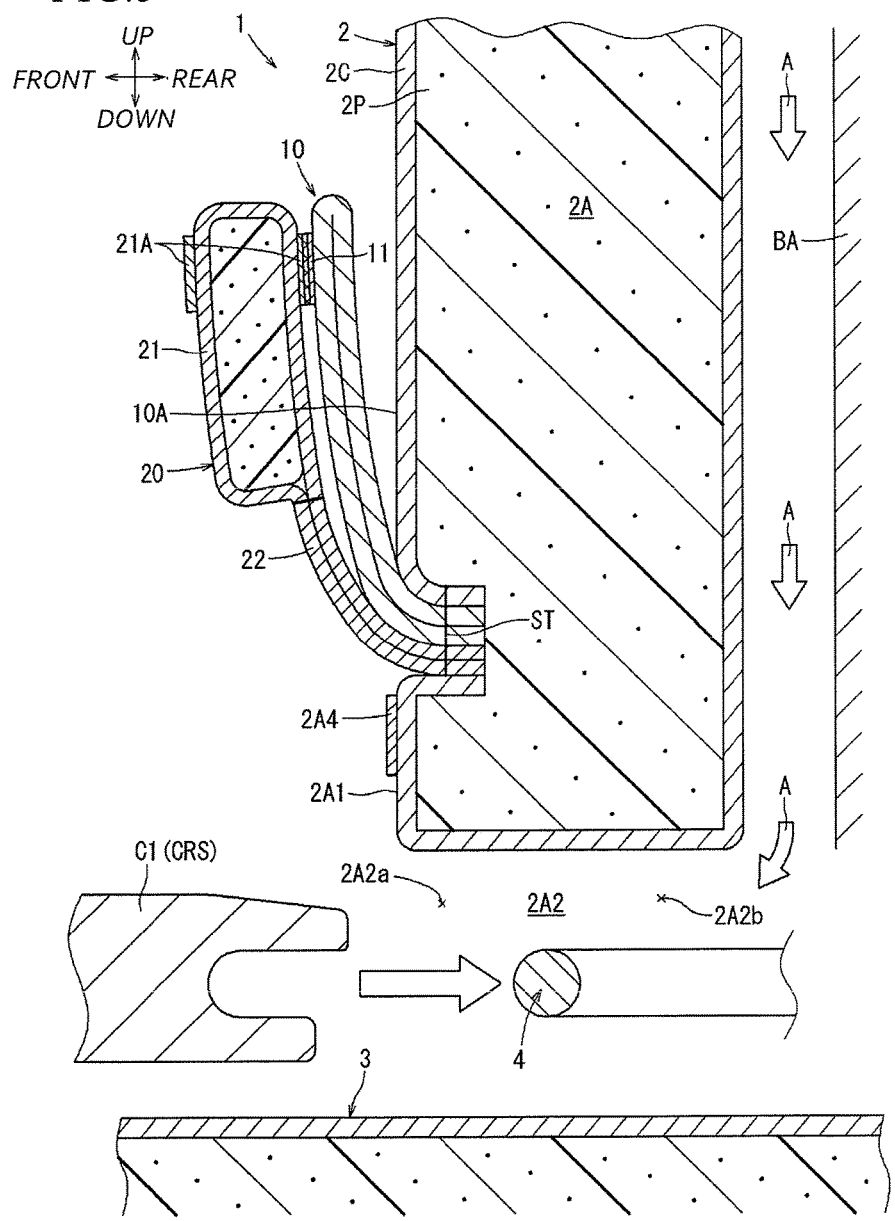
FIG. 3 is a sectional view taken along line III-III shown in FIG. 2.

As illustrated in FIGS. 2 and 3, in the lower region of the top plate body 2A of the seat back 2 covered with the cover member 10, holes 2A2 which pass through in the front and rear direction and are substantially rectangular in a front view are formed in lower corner portions on both of the right and left end sides. Specifically, each of the holes 2A2 is formed in a shape that passes through in the front and rear direction and a lower direction with respect to the seat back 2. However, the opening of the hole 2A2 in the lower direction is normally maintained in a closed state by abutting the rear end portion of the seat cushion 3 in FIG. 1 thereon from the lower side.

As illustrated in FIGS. 2 and 3, in the holes 2A2, a pair of right and left ISOFIX anchors 4 which extend from the rear lower side of the seat 1 to be fixed on a vehicle panel (not illustrated) are provided to pass from the rear side. The ISOFIX anchors 4 function as an anchor for fixing a child seat CRS, and are formed to extend in a substantially U shape in a plan view from the vehicle panel (not illustrated) to the front side. In the ISOFIX anchors 4, connectors C1 are locked thereto in such a manner that the connectors C1 provided in the two right and left places on the rear lower side of the child seat CRS are operated to be pushed from the front side with respect to the anchors (see FIGS. 11 and 12).

As illustrated in FIGS. 2 and 3, in the holes 2A2, the cover member 10 and a plug member 20 (to be described) which is provided to be separately stacked on the back side of the cover member 10 are provided on the front side, so that the hole shapes thereof are exposed to be checked visually from the front side. By such an exposure, an operation can be easily performed which inserts the connectors C1 of the child seat CRS into respective holes 2A2.

Figure 6:
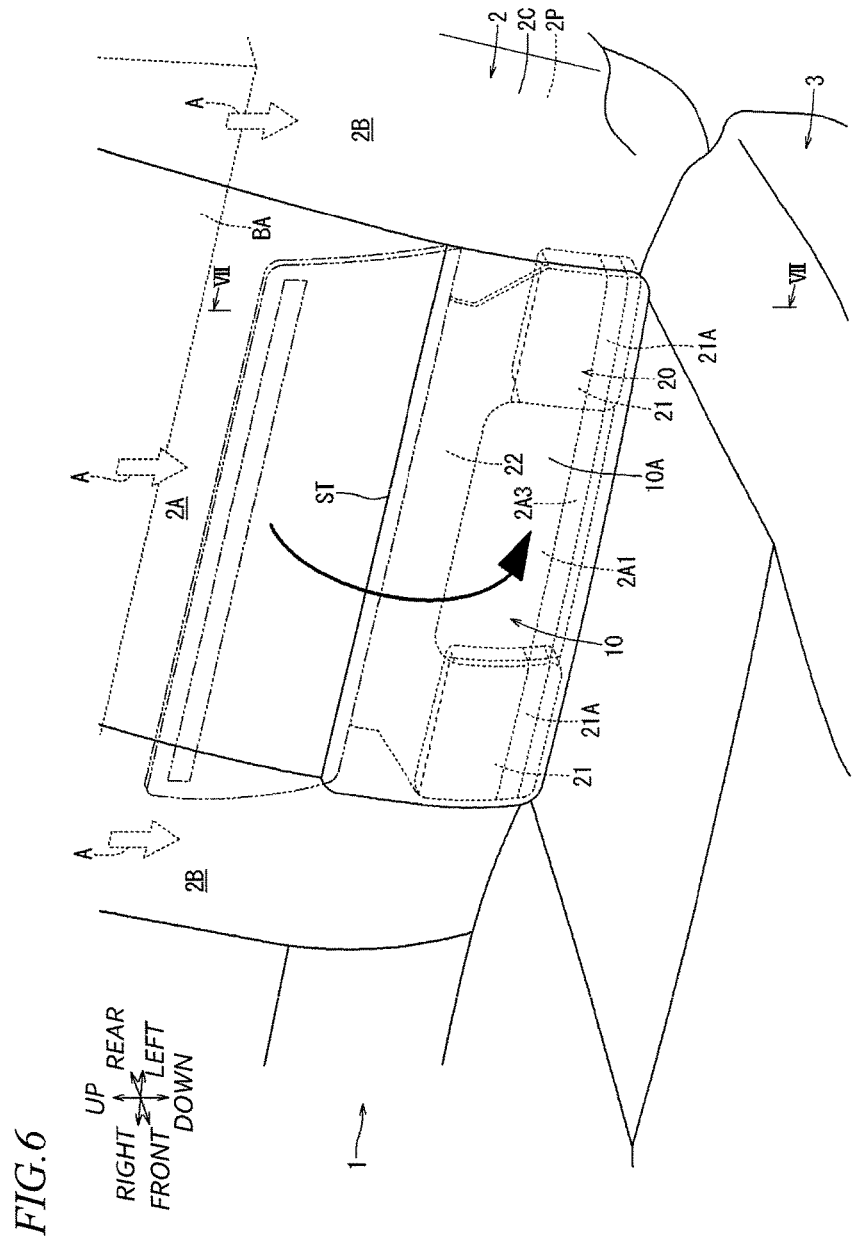
FIG. 6 is a perspective view illustrating a state where the cover member is closed.
Figure 7:
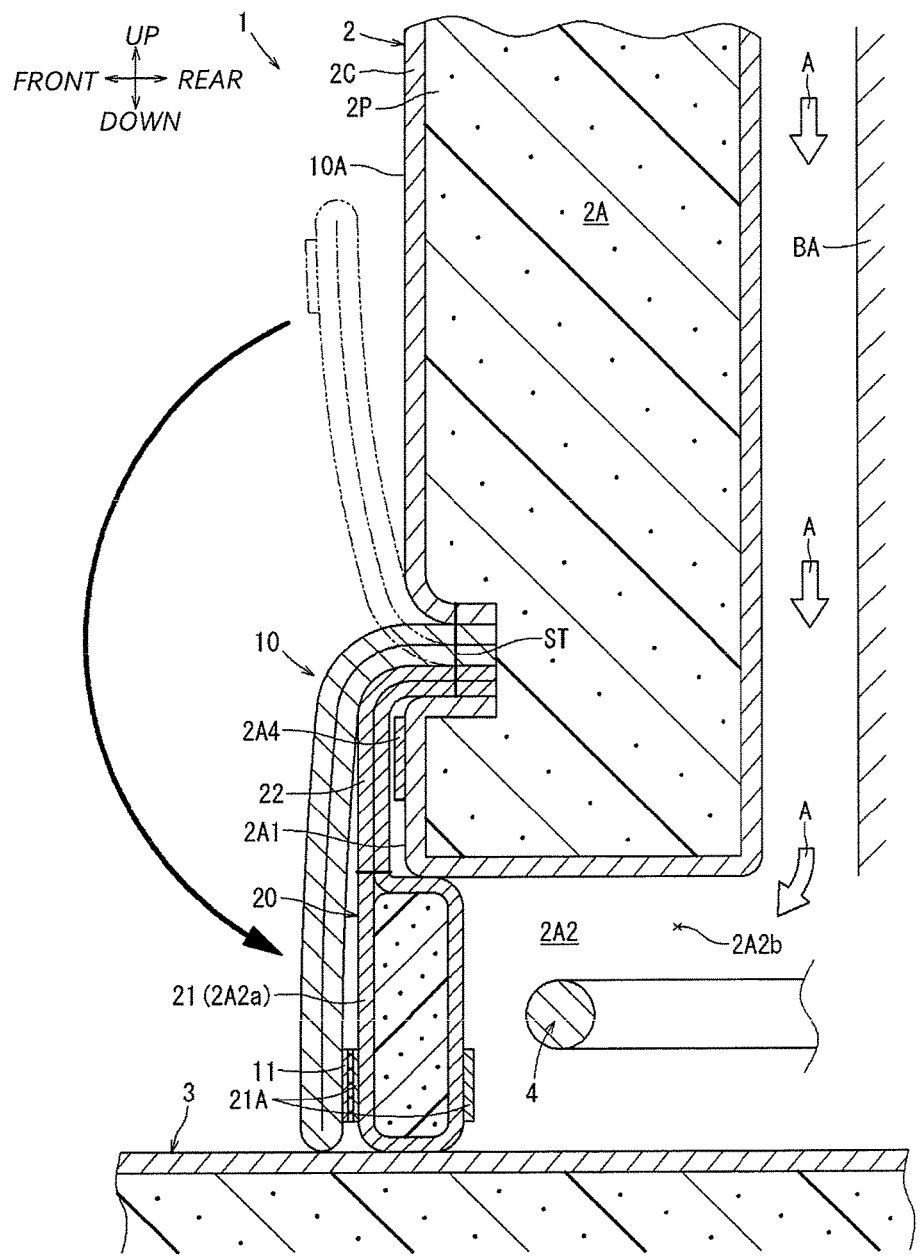
FIG. 7 is a sectional view taken along line VII-VII shown in FIG. 6.

As illustrated in FIGS. 6 and 7, in the holes 2A2, during the non-use state in which the child seat CRS is not attached, the cover member 10 is closed so that an opening 2A2a on the front side thereof and a covered surface part 2A1 in vicinity thereof are maintained to be covered all together with the cover member 10 from the front side. Incidentally, the covered surface part 2A1 and the inner peripheral surfaces of the holes 2A2 are configured such that the back pad 2P is not exposed, and a fabric cover piece covers the external surface. Herein, the seat back 2 corresponds to a "seat body" of the present disclosure.

However, the cover member 10 covers the holes 2A2 so as not to be seen in appearance, but does not cover to such an extent that the opening 2A2a on the front side thereof is closed to be a sealed state. Specifically, the cover member 10 is configured to be maintained to have the closed posture in such a manner that a horizontally-long band-shaped hook-and-loop fastener 11 (hook surface) sewn with the lower edge of the a back-side surface 10A thereof abuts on from the front side to be coupled with a horizontally-long band-shaped hook-and-loop fastener 2A3 (loop surface) sewn with the lower edge (the lower edge in an area between the arranged holes 2A2) of the covered surface part 2A1 which the cover member 10 faces in the closed state.

For this reason, even when the holes 2A2 are maintained to be covered from the front side with the cover member 10 as described above, an air-flowing channel therein is not blocked. Accordingly, in the holes 2A2, in a case where the cooling air A of the battery BA which flows in the rear area of the seat 1 from an opening 2A2b passing through to the rear side flows inside, there is a concern that the flowing cooling air A leaks out from the front opening 2A2a toward the sitting occupant. When there occurs such a leakage of the cooling air A, there is a concern that the sitting occupant feels uncomfortable.

Figure 4:
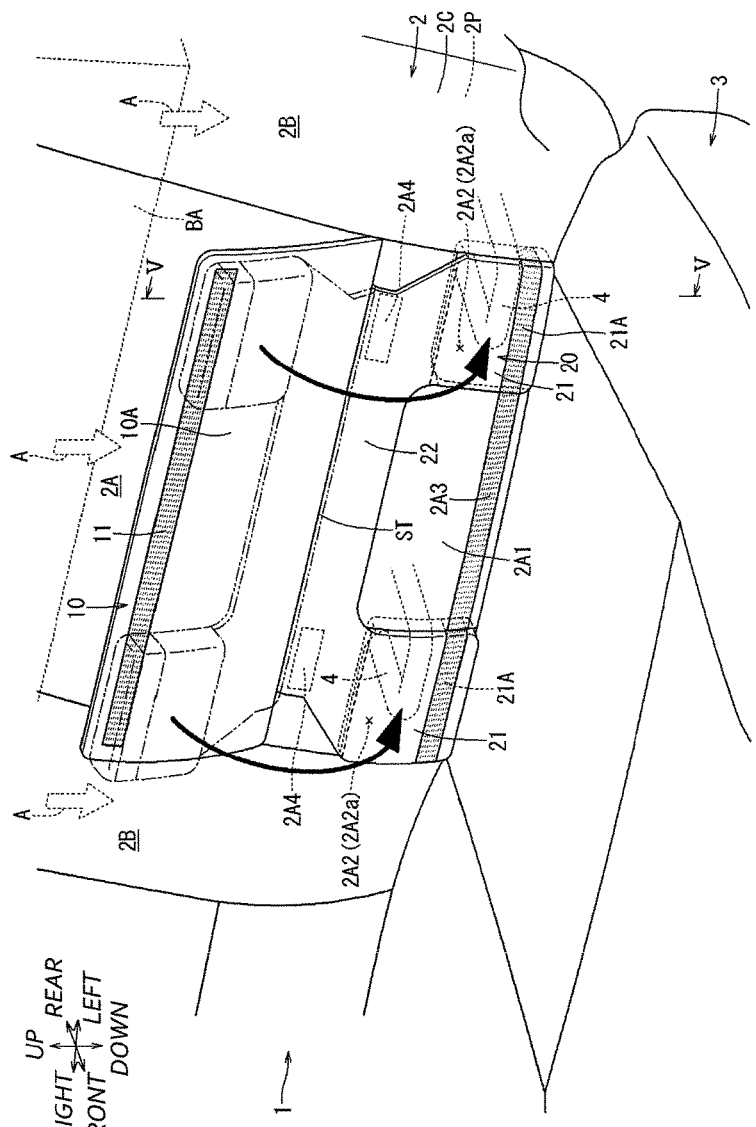
FIG. 4 is a perspective view illustrating from a state where a cover member is opened and to a state where a plug member is pushed into holes.
Figure 5:
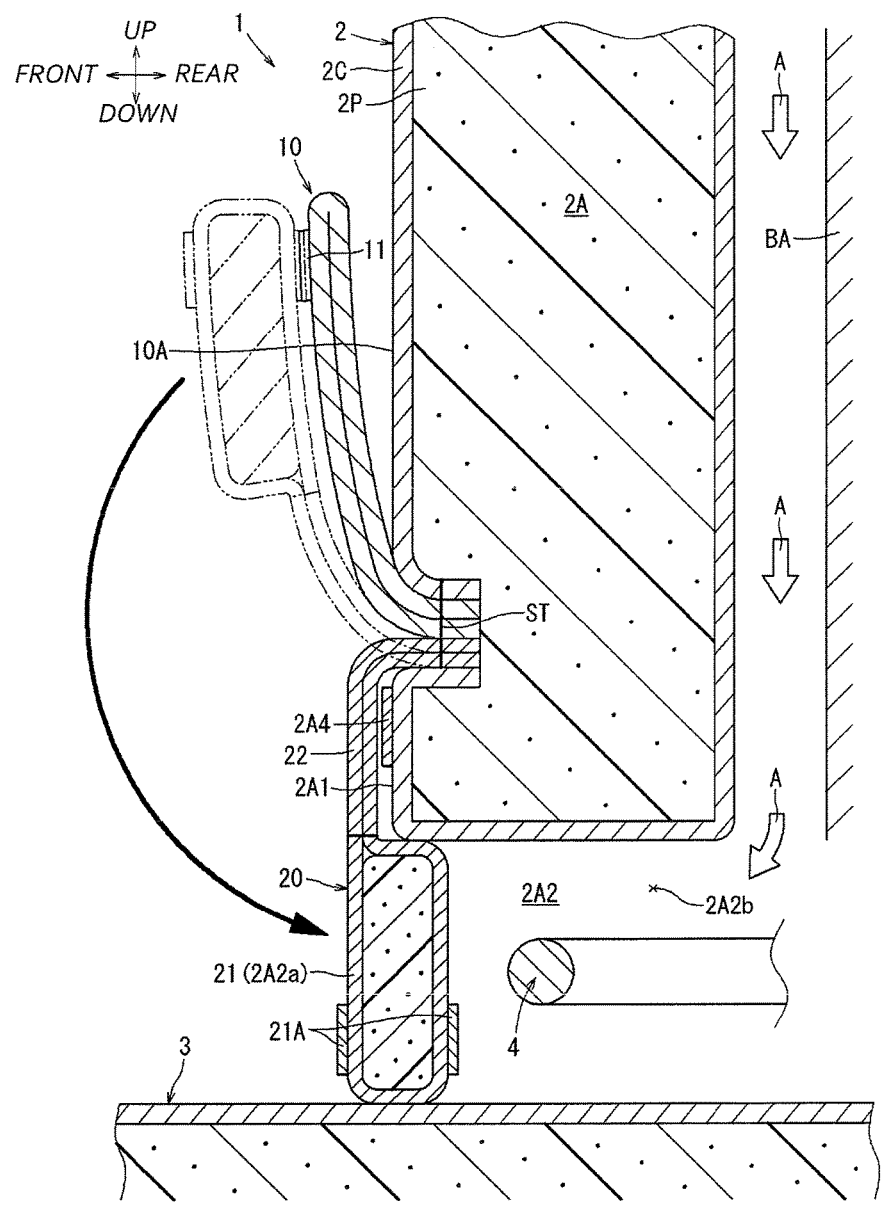
FIG. 5 is a sectional view taken along line V-V shown in FIG. 4.

Herein, in order to prevent the leakage of the cooling air A, as illustrated in FIGS. 4 and 5, the plug member 20 which functions to block the air-flowing channel in the hole 2A2 by pushing in the hole 2A2 from the front side is provided separately from the cover member 10 in the lower region of the top plate body 2A of the seat back 2. As illustrated in FIGS. 2 to 5, the plug member 20 is formed to integrally have a pair of right and left substantially rectangular push pieces 21 which are pushed in the hole 2A2 from the front side to be fitted in a shape to close the hole shape and block the air-flowing channel, and a flexible planar connection surface part 22 which crosses between the upper edges of the push pieces 21 to extend in a horizontally-long band shape.

In each of the push pieces 21, a urethane-foam pad member is buried in a flexible planar cover structure sewn in a bag shape. With such a configuration, each of the push pieces 21 is pushed in the hole 2A2 to be flexibly flattened out to conform with the hole shape of the hole 2A2. The elastic repulsive force associated with the flattening acts such that the air-flowing channel in the hole 2A2 is blocked appropriately.

As illustrated in FIGS. 2 and 3, the plug member 20 is arranged to be stacked on the back side of the cover member 10, and the upper edge of the connection surface part 22 and the upper edge of the cover member 10 are attached to be integrally sewn with the back cover 2C (sewn part ST). By the attachment, similarly to the cover member 10, the plug member 20 is configured to be rotated about a rotation center (sewn part ST) of the upper hinge separately from the cover member 10.

Figure 8:
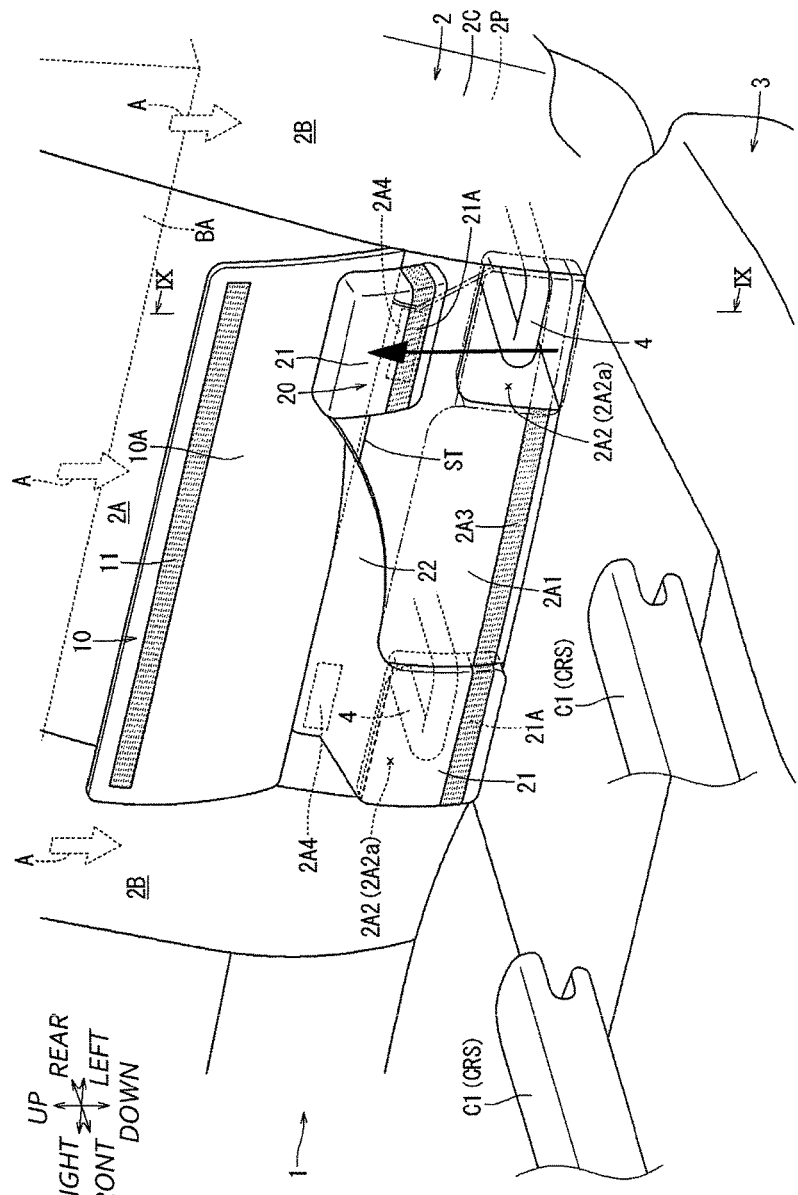
FIG. 8 is a perspective view illustrating a state of the cover member switched from the state illustrated in FIG. 6 by detaching the plug member from the hole on one side so that the cover member is position-fixed.
Figure 10:
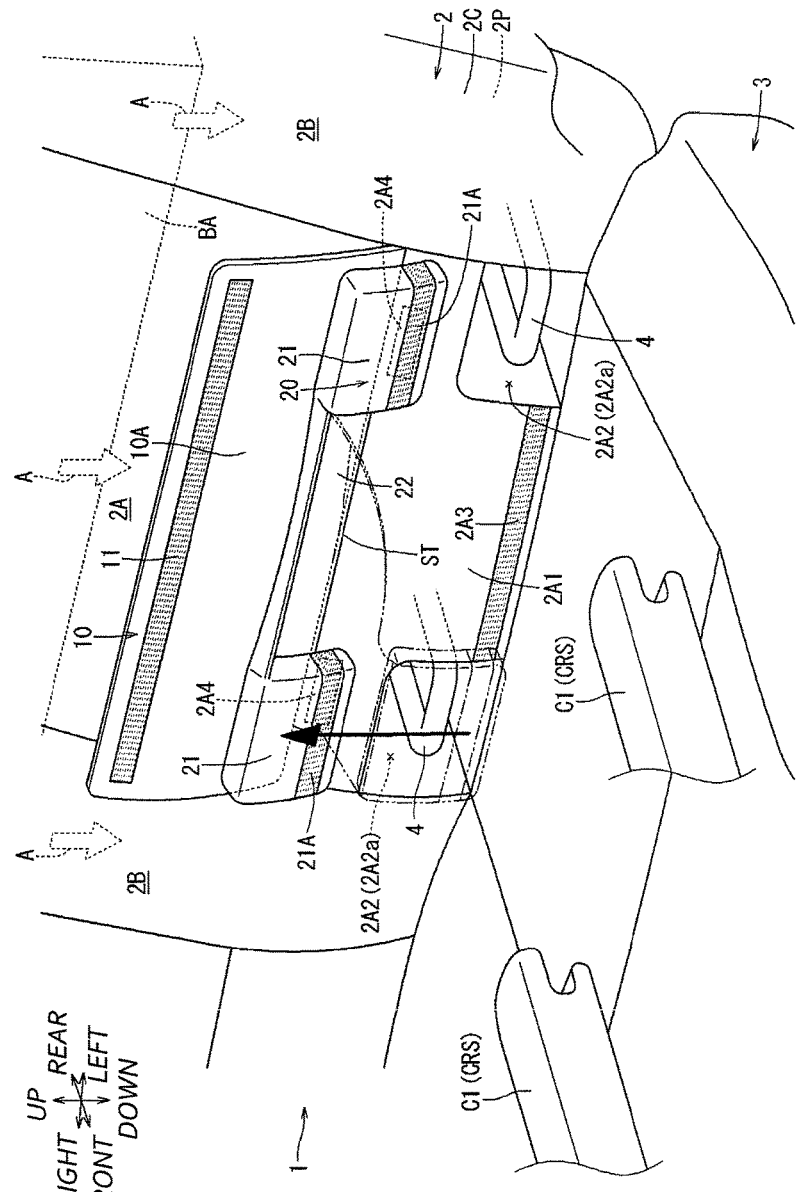
FIG. 10 is a perspective view illustrating a state of the cover member switched from the state illustrated in FIG. 8 by further detaching the plug member from the hole on the other side so that the cover member is position-fixed.

In the plug member 20, in addition to the hinge-connected configuration, the flexibility of the connection surface part 22 makes the push piece 21 be simply pushed in the hole 2A2 individually or be detached to the front side individually from the hole 2A2 as illustrated in FIGS. 8 and 10. With such a configuration, as illustrated in FIGS. 4 and 5, in the plug member 20, the push piece 21 can be appropriately pushed in while individually checking the inside of the hole 2A2 visually from a state where the cover member 10 is opened such that the hole 2A2 is seen from the front side.

In the plug member 20, the push piece 21 can be pushed inward with respect to the hole 2A2 to such a position that forms a surface which is nearly flush with the covered surface part 2A1 in vicinity of the hole 2A2. As illustrated in FIGS. 6 and 7, by pushing in as described above, even when the cover member 10 is closed to be stacked on the front side of the plug member 20, the cover member 10 can be closed and held in a shape which makes the cover member 10 substantially flush with the other area of the top plate body 2A without being interrupted by the bulging of the shape from the back side by the plug member 20.

Herein, as illustrated in FIGS. 2 and 3, in the lower edge of the push piece 21 of the plug member 20, a horizontally-long band-shaped hook-and-loop fastener 21A (loop surface) is provided over the entire circumferential area of the external surface along the edge to be sewn annularly. As illustrated in FIGS. 4 and 5, when the push piece 21 is set to be pushed in the hole 2A2, the hook-and-loop fastener 21A (loop surface) sewn with the push piece 21 is provided to be arranged in a lateral line with respect to the hook-and-loop fastener 2A3 (loop surface) sewn along the lower edge of the covered surface part 2A1.

Therefore, after the push piece 21 is set to be pushed in the hole 2A2, by closing the cover member 10, the horizontally-long band-shaped hook-and-loop fastener 11 (hook surface) sewn with the lower edge of the back-side surface 10A of the cover member 10 not only abuts on and is coupled with the hook-and-loop fastener 2A3 sewn along the lower edge of the covered surface part 2A1 as described above, but also abuts on and is coupled with the hook-and-loop fastener 21A sewn along the lower edge of the push piece 21. By coupling as described above, in the cover member 10, both corner portions caught by the formed area of the hole 2A2 are also maintained by the push piece 21 which is pushed in to be fitted into the hole 2A2 to be fixed in a position to prevent rattling with respect to the hole 2A2.

Figure 9:
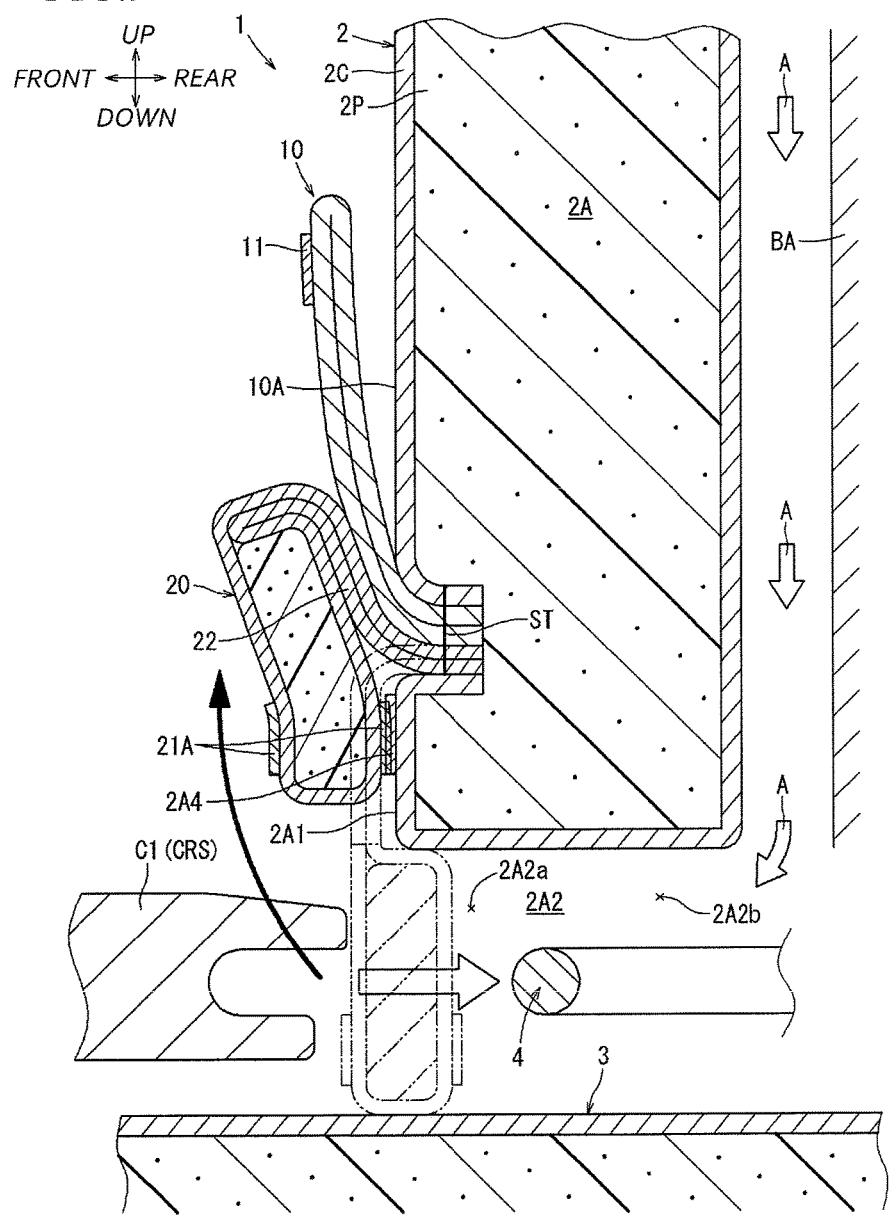
FIG. 9 is a sectional view taken along line IX-IX shown in FIG. 8.

As illustrated in FIGS. 8 to 10, when the cover member 10 is opened so that the connector C1 of the child seat CRS is pushed in and locked with the ISOFIX anchor 4, the plug member 20 is switched to function as a stopper which can maintain the cover member 10 as the opened state by detaching the push piece 21 from the hole 2A2 to change the attachment position thereof as follows. That is, after the cover member 10 is opened, the plug member 20 is switched into the state of preventing the dropping movement of the cover member 10 toward the closed position in such a manner that the push piece 21 is detached forward from the hole 2A2, and the hook-and-loop fastener 21A sewn on the back side of the push piece abuts on and is coupled with the hook-and-loop fastener 2A4 (hook) sewn in the upper place from the hole 2A2 of the covered surface part 2A1. Herein, the push piece 21 corresponds to a "stopper" of the present disclosure, and the hook-and-loop fastener 21A corresponds to an "engagement part" of the present disclosure.

Specifically, by coupling as described above, the push piece 21 crosses the rotation center (sewn part ST) of the upper hinge of the cover member 10 overhead and is maintained to have a stand-up posture where the shape is overhung. By maintaining the state of the push piece 21, the push piece 21 which abuts on an abutting part 21B crossing the rotation center (sewn part ST) overhead supports the cover member 10 to prevent the rotation movement of the cover member 10 toward the closed position, and such a state is maintained. Specifically, the push piece 21 is overhung to the upside by being coupled with the corresponding hook-and-loop fastener 2A4, and is maintained in a state where the connection surface part 22 is pulled upward.

By pulling the connection surface part 22 as described above, even when the push piece 21 receives a closing force by a gravity action of the cover member 10, the push piece 21 receives the closing force as a force of acting a pulling force on the connection surface part 22. Therefore, the cover member 10 can be appropriately maintained in position as the opened state by a force with which the push piece 21 is coupled with the hook-and-loop fastener 2A4, a force in which the connection surface part 22 receives from the gravity action of the cover member 10 as the pulling force, and the hardness of the push piece 21 which receives the force with bending in some degree.

Figure 11:
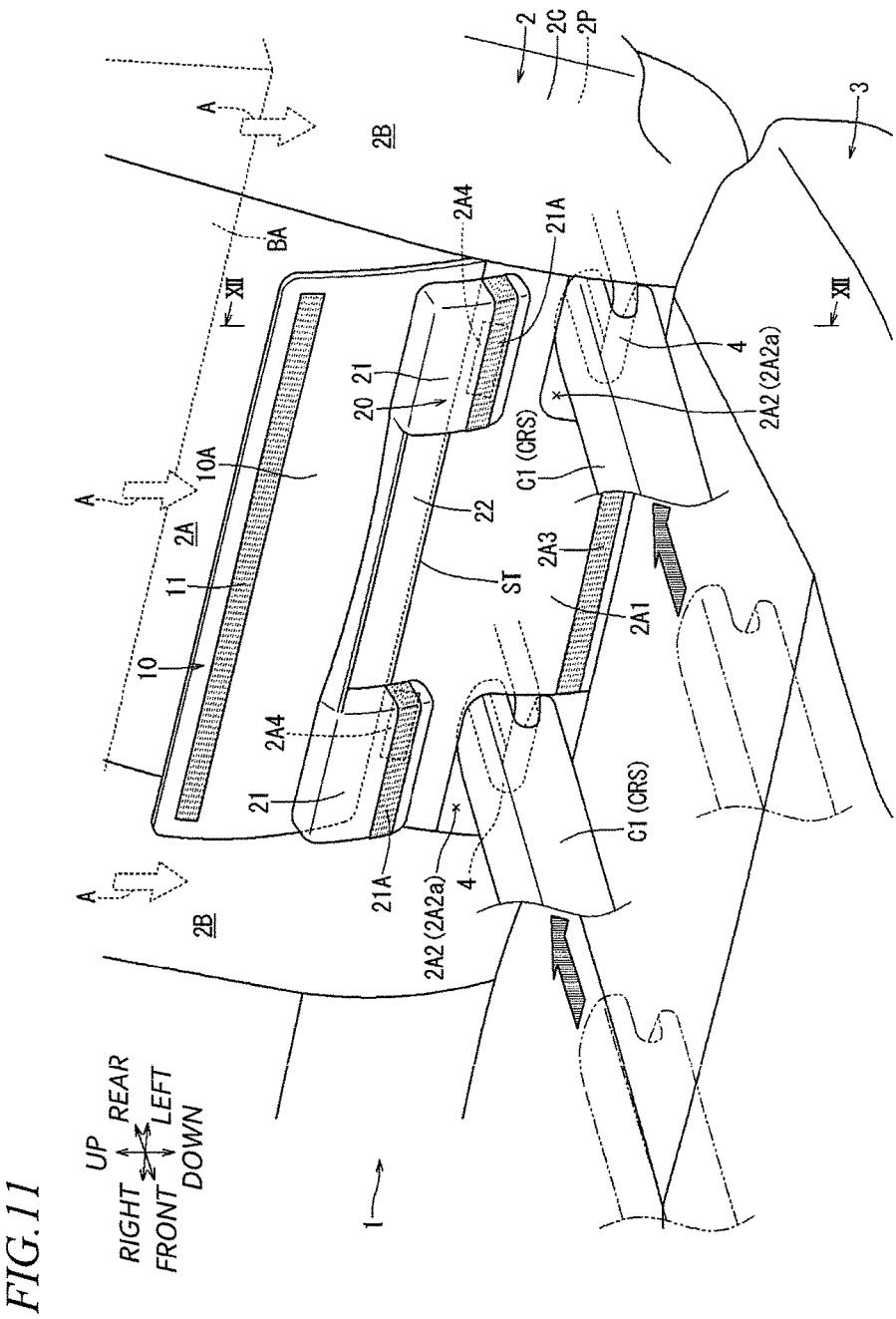
FIG. 11 is a perspective view illustrating a state where a child seat is mounted.
Figure 12:
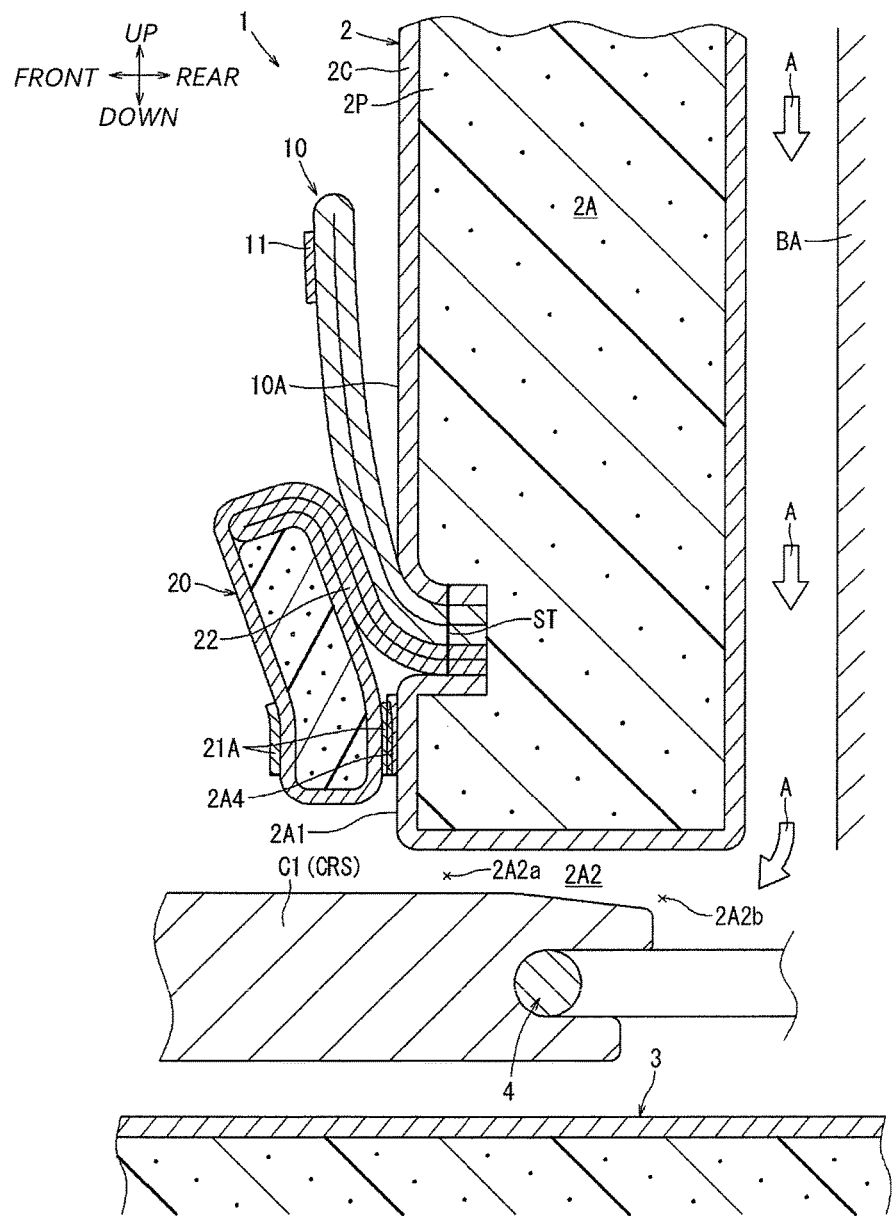
FIG. 12 is a sectional view taken along line XII-XII shown in FIG. 11.

As a result, the cover member 10 is maintained in the opened posture, and thus the hole 2A2 is maintained to be exposed to front side. Therefore, as illustrated in FIGS. 11 and 12, without performing that the cover member 10 is caught and opened by a hand and is maintained as the opened state, the connector C1 of the child seat CRS can be inserted into the hole 2A2 and be locked in the ISOFIX anchor 4, and the child seat CRS can be simply mounted in the seat 1.

To summarize, the seat 1 according to the embodiment is configured as follows. That is, a vehicle seat (seat 1) which has a cover member (cover member 10) which covers and hides at least a portion of an ISOFIX anchor (ISOFIX anchor 4) for fixing a child seat (child seat CRS) and is openable and closable. The vehicle seat includes a rear surface of the cover member which is directed to a seat back side when the cover member (cover member 10) is closed to cover and hide the ISOFIX anchor (ISOFIX anchor 4) and is reversely directed to a seat front side when the cover member (cover member 10) is opened, a rear surface (rear surface 10A) of the cover member (cover member 10), an intermediate portion (i.e. an intermediate wall; covered surface part 2A1) which is exposed between the cover member (cover member 10) and the ISOFIX anchor (ISOFIX anchor 4) when the cover member (cover member 10) is opened, and a stopper (each push piece 21) which is fixed in a state where the cover member (cover member 10) is opened. The stopper (each push piece 21) has an engagement part (hook-and-loop fastener 21A) which is engaged to be detachable to at least one (intermediate portion (covered surface part 2A1)) of the rear surface (rear surface 10A) and the intermediate portion (covered surface part 2A1) in a state where the cover member (cover member 10) is opened, and an abutting part (abutting part 21B) which abuts on the other thereof (rear surface (rear surface 10A)) so as to regulate that the cover member (cover member 10) moves in a closing direction.

In this manner, with the simple configuration that the stopper (push piece 21) is provided in a detachable manner to extend over between the rear surface (rear surface 10A) and the intermediate portion (covered surface part 2A1) directed to the seat front side when the cover member (cover member 10) is opened, the cover member (cover member 10) can be appropriately maintained in position in the opened state.

The engagement part (hook-and-loop fastener 21A) of the stopper (each push piece 21) is configured by a hook-and-loop fastener. With such a configuration, the engagement part (hook-and-loop fastener 21A) of the stopper (each push piece 21) can be configured simply and compactly.

The ISOFIX anchor (ISOFIX anchor 4) is provided in a recess part (hole 2A2) which is formed in the vehicle seat (seat 1) and is recessed from a seat front side. The stopper (each push piece 21) is connected with the one (intermediate portion (covered surface part 2A1)) or the other (rear surface (rear surface 10A)), and can be stowed in the recess part (hole 2A2) in a shape not to inhibit that the cover member (cover member 10) moves to be closed. With such a configuration, by stowing the stopper (push piece 21) during non-use in the recess part (hole 2A2) and closing the cover member (cover member 10), the cover member can be closed with an improved appearance to the outside while the stopper (each push piece 21) is provided.

The cover member (cover member 10) and the stopper (each push piece 21) are connected to be hinge-rotatable about the same rotation center with respect to the vehicle seat (seat 1). With such a configuration, the cover member (cover member 10) and the stopper (each push piece 21) can be moved with the same operation sense, and the operability thereof can be improved.

The cover member (cover member 10) is opened and closed by a rotation of an upper hinge. With such a configuration, there is no concern that the cover member (cover member 10) rides on the child seat (child seat CRS) when the cover member (cover member 10) is opened. Thus, the child seat (child seat CRS) can be maintained in a more stable position-fixed state. In addition, after being released from the position-fixed state of the stopper (each push piece 21), the cover member (cover member 10) can be biased by the gravity action in a closing direction.

As described above, the embodiment of the present disclosure is described using one example, but the invention according to the present disclosure may be implemented in various modes other than the above example. For example, the configuration of the vehicle seat of the invention according to the present disclosure may be widely applied to another seat which is supplied for another vehicle such as a vehicle other than the automobile, a train, an airplane, and a ship. In addition, a portion which is bulge in a bank shape is formed in the rear portion of the seat cushion, and the ISOFIX anchor may be provided in a place such as the hole formed in the same portion (seat body). The ISOFIX anchor is not necessarily in the recess part (including the through-hole pass) which is formed in the seat and is recessed from the seat front side, and may be provided in the seat pad to be embedded on the substantially same plane such that a partial shape is exposed.

The cover member which covers and hides the ISOFIX anchor is not limited to the upper hinge, and may be configured to be a type that is opening/closing rotated by a side hinge or a lower hinge. In addition, the cover member is not necessarily configured to cover and hide the entire body of the ISOFIX anchor, and may be configured to cover and hide at least a portion. In addition, the stopper may be configured to be moved according to a linear movement or a rotation movement using a rotation hinge differently from the cover member. In addition, the stopper may be provided to be detachable with respect to both of the cover member and the intermediate portion as well as the stopper is provided to be detachable in the cover member and to abut simply on the intermediate portion.

The engagement part of the stopper may be formed as various detachable structures such as a linear fastener, a button, a hook, and an insertion engagement structure in addition to the hook-and-loop fastener. In addition, the stopper may be configured as a separate body which is not connected with any one as well as the stopper is connected with any one of the cover member or the intermediate portion to be detachable as described above.

What is claimed is:

1. A vehicle seat comprising:
    a cover member that covers and hides at least a portion of an ISOFIX anchor for fixing a child seat and is openable and closable, the cover member having a rear surface that is directed to a seat back side in a state where the cover member is closed to cover and hide the ISOFIX anchor and is reversely directed to a seat front side when the cover member is opened;
    an intermediate portion that is exposed at a position between the cover member and the ISOFIX anchor in a state where the cover member is opened; and
    a stopper that retains the cover member in a state where the cover member is opened,
    wherein the stopper has an engagement part and an abutting part,
    wherein the engagement part of the stopper is detachably engaged with at least one of the rear surface and the intermediate portion in a state where the cover member is opened, and
    wherein the abutting part of the stopper abuts on the other of the rear surface and the intermediate portion so as to prevent the cover member from being moved in a closing direction.

2. The vehicle seat according to claim 1,
    wherein the engagement part of the stopper includes a hook-and-loop fastener.

3. The vehicle seat according to claim 1,
    wherein the ISOFIX anchor is provided in a recess part which is formed in the vehicle seat and is recessed from the seat front side, and
    wherein the stopper is connected with one of the rear surface and the intermediate portion, and is configured to be stowed within the recess part in a mode allowing closing movement of the cover member.

4. The vehicle seat according to claim 3,
    wherein the cover member and the stopper are connected with each other at a hinge portion to be swingable about a rotation center of the hinge portion.

5. The vehicle seat according to claim 1,
    wherein the cover member is opened and closed by a rotation of an upper hinge.

6. A vehicle seat comprising:
    a child seat attachment portion provided with an ISOFIX anchor to which a child seat is detachably attached;
    a cover member having a rear surface and configured to be movable between a closed position at which the cover member covers the child seat attachment portion in a state where the rear surface is faced toward a rear side of the vehicle seat and an opened position at which the cover member is flipped to face the rear surface toward a front side of the vehicle seat and exposing the child seat attachment portion;
    an intermediate wall that is located at a position between the ISOFIX anchor and the cover member, the intermediate wall being exposed in a state where the cover member is at the opened position; and a stopper member having an engagement part and an abutting part, the stopper member being configured to retain the cover at the opened position in a state where the engagement part is detachably engaged with at least one of the rear surface and the intermediate wall while the abutting part abuts on the other of the rear surface and the intermediate wall.

7. The vehicle seat according to claim 6,
wherein the engagement part of the stopper member includes a hook-and loop fastener.

8. The vehicle seat according to claim 6,
wherein the child seat attachment portion is provided with a recessed part that is formed in the vehicle seat and is recessed from the seat front side, the recessed part in which the ISOFIX anchor is provided,
wherein the stopper member is connected with one of the rear surface of the cover member and the intermediate wall, and
wherein the stopper member is configured to be stowed within the recessed part to allow the cover member to be retained at the closed position.

9. The vehicle seat according to claim 8,
wherein the cover member and the stopper member are swingably connected with each other at a hinge portion located above the recessed part.

10. The vehicle seat according to claim 6,
wherein the cover member is swingably attached to a hinge portion located above the child seat attachment portion.

\* \* \* \* \*